United States Patent [19]

Tassen

[11] 4,352,633
[45] Oct. 5, 1982

[54] WINDMILL BLADE STALLING AND SPEED CONTROL DEVICE

[76] Inventor: Devon E. Tassen, 10335 Old 44 Dr., Millville, Calif. 96062

[21] Appl. No.: 143,728

[22] Filed: Apr. 25, 1980

[51] Int. Cl.³ .............................. F03D 7/02; F03D 7/04
[52] U.S. Cl. ....................................... 416/137; 416/206
[58] Field of Search ............... 416/137, 135 A, 136 R, 416/206, 89 A

[56] References Cited

U.S. PATENT DOCUMENTS

| | | | |
|---|---|---|---|
| 2,052,454 | 8/1936 | Ellwood et al. | 416/89 X |
| 2,118,201 | 5/1938 | Hood | 416/89 A X |
| 2,282,077 | 5/1942 | Moore | 416/137 X |
| 2,319,592 | 5/1943 | Fiedler | 416/136 X |
| 2,391,778 | 12/1945 | Gregor | 416/51 |
| 2,685,932 | 8/1954 | Hartel | 416/51 X |
| 4,202,655 | 5/1980 | Maloof | 416/137 X |
| 4,257,736 | 3/1981 | Jacobs | 416/51 A |
| 4,257,740 | 3/1981 | Duez | 416/137 |

FOREIGN PATENT DOCUMENTS

| | | | |
|---|---|---|---|
| 63740 | 3/1943 | Denmark | 416/137 |
| 974952 | 2/1951 | France | 416/137 |
| 2374531 | 8/1978 | France | 416/89 A |
| 2401331 | 4/1979 | France | 416/135 A |
| 480989 | 5/1953 | Italy | 416/135 A |
| 20086 | 2/1909 | Norway | 416/51 A |

*Primary Examiner*—Everette A. Powell, Jr.
*Attorney, Agent, or Firm*—Sixbey, Friedman & Leedom

[57] ABSTRACT

The windmill stalling and speed control device is mounted in the blade supporting hub of a windmill and is operative in response to blade rotation induced by a blade pitch control unit. The device includes a biasing assembly mounted to oppose blade rotation in at least one direction and a stage adjustment unit which operates to aid the biasing unit and increase the opposition to blade rotation when the windmill hub and blades reach and remain within predetermined speed ranges.

6 Claims, 3 Drawing Figures

4,352,633

WINDMILL BLADE STALLING AND SPEED CONTROL DEVICE

DESCRIPTION

Technical Field

The present invention relates generally to windmill systems for driving electric generating units, compressors, and pumping equipment and more particularly to a windmill blade stalling and speed control device which operates to control the RPM of a windmill while cycling the blades through different power positions in response to wind speed.

Background Art

In the past, many types of windmills have been designed to drive compressors, electrical generating systems, pumps, and the like, and for many of these applications, it is necessary for the windmill to rotate at a relatively constant speed regardless of wind velocity. To accomplish windmill RPM regulation, governing systems have been developed which employ centrifugal force to move the blades of a windmill propeller longitudinally against a spring bias. Suitable bearing means are provided to rotate the windmill blade about the longitudinal axis thereof in response to this longitudinal movement of the blade, thereby altering the blade pitch in response to the centrifugal force developed by windmill RPM. Prior art systems of this type, such as those illustrated in U.S. Pat. Nos. 1,877,622 to G. M. Beard, 2,118,201 to H. C. Hood, and 2,547,636 to C. Fumagalli, have provided effective speed regulation over a range of normal wind velocities. However, these spring biased governor systems have been found to malfunction in situations where wind velocities increase rapidly and gusting winds occur.

Often, when wind velocity increases suddenly, the centrifugal force on the windmill blades will cause the blades to move longitudinally very rapidly, thereby overcoming almost completely the bias of the biasing spring. When this occurs, the blade pitch is not adjusted to a power position which might normally result from a steady wind of similar velocity, but instead the blade is driven past this power position and may even be fully feathered.

Disclosure of the Invention

The primary object of this invention is to overcome the disadvantages of the prior art as noted above and, specifically, to provide a novel and improved windmill blade stalling and speed control device which operates to maintain windmill blades longer in an effective power position in conditions where wind velocities are rapidly changing.

Another object of this invention is to provide a novel and improved windmill blade stalling and speed control device wherein a vernier adjustment mechanism is combined with a speed governor biasing spring to increase opposition to the centrifugal force acting on the windmill blades when the speed of rotation of the windmill is within a predetermined speed range.

A further object of the present invention is to provide a novel and improved windmill blade stalling and speed control device which is operative to change the bias curve of a speed governor biasing spring to maintain the windmill blades in a power position for longer periods of time when centrifugal force on the blades is rapidly increased by rapidly increasing wind velocities. In accordance with this objective, one embodiment of the present invention includes a windmill hub including a casing with blade support units mounted upon the casing. The blade support units each mount a windmill shaft for longitudinal and rotational movement relative to the support unit. A blade pitch control assembly is mounted within the casing to cause the rotation of the windmill shaft to alter the pitch of the windmill blade, while a speed control assembly mounted within the casing includes a biasing unit to oppose in at least one direction relative movement between the blade shaft and the blade support unit. The opposition provided by the biasing unit is aided by the action of a stage adjustment assembly when the windmill hub and blades are rotating within a predetermined speed range.

Still other and more specific objects of this invention will become apparent upon consideration of the following description of the Best Mode For Carrying Out the Invention taken in conjunction with the accompanying drawings.

BEST MODE FOR CARRYING OUT THE INVENTION

Figure 1:
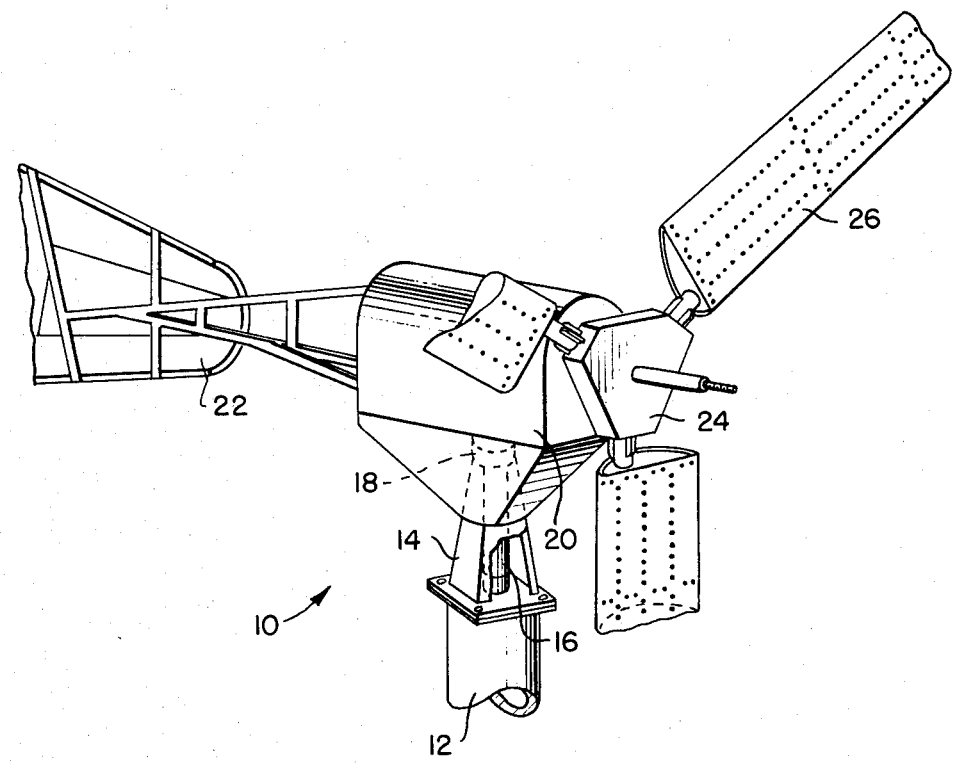
FIG. 1 is a perspective view of a windmill with the windmill blade stalling and speed control device of the present invention.

Referring now to FIG. 1, the windmill stalling and speed control device of the present invention is employed in combination with a windmill indicated generally at 10 which is mounted upon a suitable base or support tower 12 by a pedestal 14. This pedestal contains a driven shaft 16 and a bearing assembly 18 upon which the main windmill housing 20 is pivoted. Mounted upon the housing 20 are known windmill components such as a stabilizing tail assembly 22 and a rotatable hub 24 which supports the windmill blades 26. The hub 24 is supported for rotation relative to the housing 20 by any conventional rotatable support means.

Figure 2:
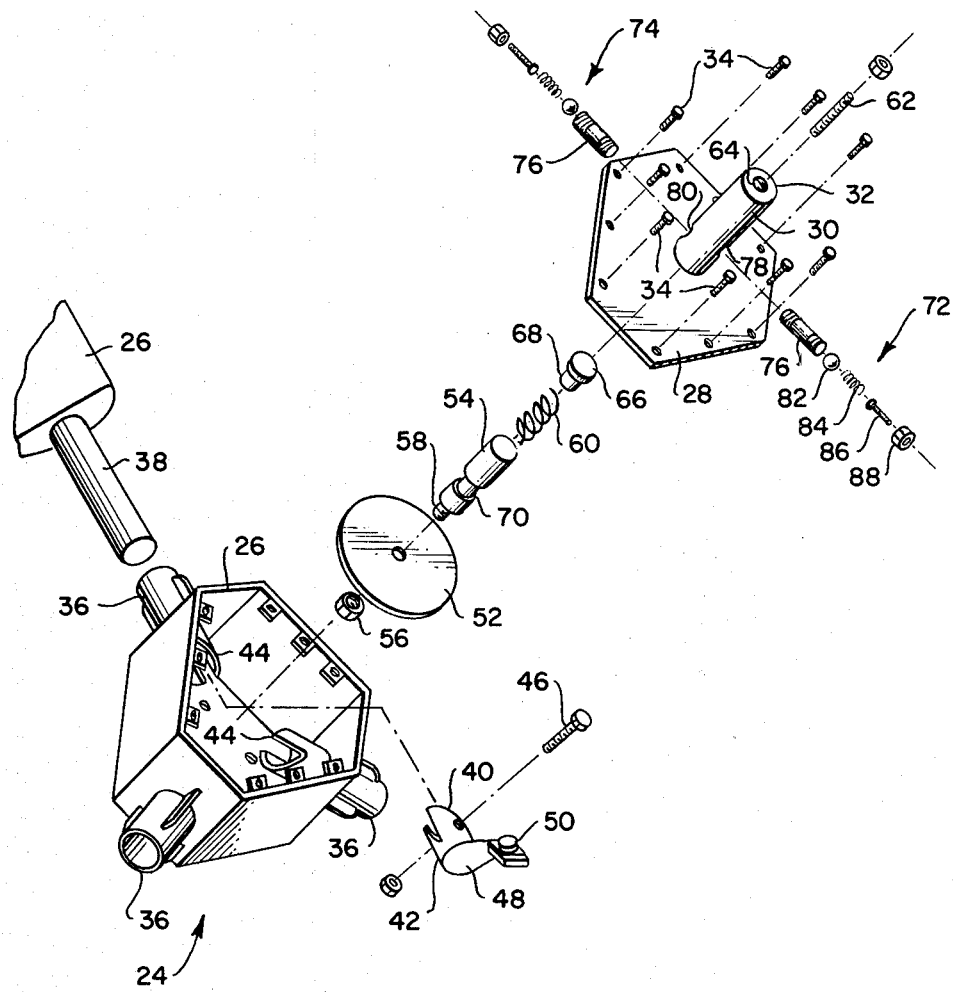
FIG. 2 is an exploded view of the windmill blade stalling and speed control device of FIG. 1.

Referring now to FIG. 2, it will be noted that the hub 24 forms a casing 26 having a cover 28 which may be removed to expose the interior of the casing. Projecting from the outer side of the cover 28 is a cylindrical shaft receiving member 30 having a closed end 32. The cover 28 may be secured to the casing 26 by means of suitable bolts or fasteners 34 to form a closed enclosure.

A plurality of cylindrical shaft supports 36 are secured to the casing 26 and communicate with the interior of the casing. These shaft supports each receive a stub shaft 38 for a windmill blade 26 and retain the stub shaft for both longitudinal and rotational movement. This is to permit the stub shaft to move longitudinally and outwardly away from the hub 24 in response to centrifugal force, and at the same time to rotate relative to the shaft support 36 to change the pitch of the blade 26.

There are a number of methods known to the prior art for forming the shaft supports 36 to cooperate with members on the stub shaft 38 so that as the stub shaft moves longitudinally, it will be rotated relative to the shaft support. Preferably, however, this rotating pitch control function is performed by the cam structure illustrated in FIG. 2. This cam structure includes a cam surface 40 which is formed upon a blade control dog 42 and which is contoured to cooperate with a cam surface 44 formed upon the innermost end of the shaft support 36. Each blade control dog 42 has a cylindrical section which terminates at the cam surface 40, and this cylindrical section is designed to receive the innermost end of the stub shaft 38 for a windmill blade 26. The blade control dog is secured to the end of each stub shaft by a bolt or other suitable fastening means 46.

Each blade control dog 42 includes a lever arm 48 extending from one end thereof in a plane which is substantially perpendicular to the longitudinal axis of the attached stub shaft 38. The lever arm 48 supports a bearing member 50 which is adapted to contact the surface of a dog bearing plate 52. A stub shaft 54 projects from the opposite surface of the dog bearing plate 52 and is secured centrally thereto by a nut 56 which cooperates with threads 58 on the inner end of the stub shaft. The stub shaft is designed to extend into and to move longitudinally relative to the cylindrical shaft receiving member 30. This movement is opposed by a spring 60 which extends between the end of the stub shaft 54 and the end 32 of the shaft receiving member 30. The bias of the spring 60 may be adjusted by means of a screw adjust member 62 which is threaded into a threaded opening 64 in the end 32 of the shaft receiving member and which bears against a button 66 having a reduced cylindrical section 68. Section 68 is inserted within the spring 60.

When the structure of FIG. 2 is assembled, the stub shafts 38 of the three blades 26 will be individually received within the three shaft supports 36. The inner end of each stub shaft will be connected to a blade control dog 42 having a bearing surface 40 which rests against the bearing surface 44 of the associated shaft support. The length of each stub shaft 38 is sufficient to permit longitudinal movement of the shaft relative to its associated shaft support, and as each stub shaft moves outwardly away from the hub 24, the contacting cam surfaces 40 and 44 will cause the blade control dogs 42 to rotate the shaft and at the same time to move the bearings 50 outwardly against the dog bearing plate 52. This outward movement of the bearings 50 causes the dog bearing plate to move the stub shaft 54 longitudinally toward the end 32 of the shaft receiving member 30 against the bias of the spring 60. Thus as the centrifugal force exerted on the blades 26 due to the rotation thereof at higher speeds in response to increased wind velocity moves the blade stub shafts 38 outwardly from the hub 24, the pitch of each blade is changed to maintain the RPM of the windmill substantially constant. This speed control function as performed by the novel assembly of FIG. 2 to this point is substantially similar to the speed control operation performed by other known windmill systems.

At low wind speeds, the blades 26 are in a start up or power position, and are held there by the compression action of the spring 60 transmitted through the dog bearing plate 52, the bearings 50 and the blade control dogs 42 to the stub shafts 38 of the blades. As wind speed increases, centrifugal force begins to overcome the bias force of the spring 60, thereby permitting the stub shafts 38 to move longitudinally and to be rotated by the camming action of the cam surfaces 40 and 44. This changes the pitch of the blades 26 until equilibrium is again restored between the opposing centrifugal force on the blade and the bias force of the spring 60. At this point, the blade will then normally be retained in a new power pitch position to maintain substantially constant the RPM of the windmill 10. However, in situations where wind velocity increases rapidly and particularly in wind gust conditions where wind velocity may increase rapidly from a first point to a second higher point and then immediately decrease to an intermediate point, the bias of the spring 60 is not sufficient to oppose the increase in centrifugal force created. Consequently, the rapid rise in centrifugal force will cause the rapid compression of the spring 60 so that spring compression will not stop at an equilibrium point where spring compression would normally cease if the increase in wind velocity was gradual. Instead, the rapid increase in centrifugal force will cause the spring to pass by this equilibrium point and continue to compress, and often the extent of blade rotation permitted by the camming surfaces 40 and 44 is reached. Thus the windmill blades are driven to a full stall position, when in fact this action is not justified by the sustained wind velocity.

To preclude the windmill blades 26 from being moved unnecessarily from a desired maximum power position in response to temporarily but rapidly increasing wind velocity, a vernier adjustment mechanism is provided to change the compression curve of the spring 60. The adjustment mechanism operates to aid the biasing spring 60 in opposing the centrifugal force on the blades 26 when the RPM of the windmill is within one or more predetermined speed ranges. This delays the rotation of the blades 26 to maintain the blades at power positions attained during various stages of compression of the spring 60, thus preventing the blades from being unnecessarily moved out of these power positions in response to rapid and temporary increases in wind velocity. To accomplish this action, the stub shaft 54 is provided with a circumferential slot 70 which forms a detent therein. This detent cooperates with two spring pressed ball detent mechanisms 72 and 74 which are mounted upon the cylindrical shaft receiving member 30. Since the structure of these ball detent mechanisms is identical, both will be described with respect to the structure of the ball detent mechanism 72. This mechanism includes a cylindrical ball retention section 76 having one threaded end which is threaded into an opening 78 in the member 30. The corresponding ball retention section of the ball detent mechanism 74 is threaded into an opening 80, which is offset longitudinally from the opening 78. The cylindrical ball retention section 76 houses a ball 82, a bias spring 84 and a threaded spring retainer 86. This spring retainer has a threaded shank which extends through a cap 88 secured to close the open end of the ball.

Figure 3:
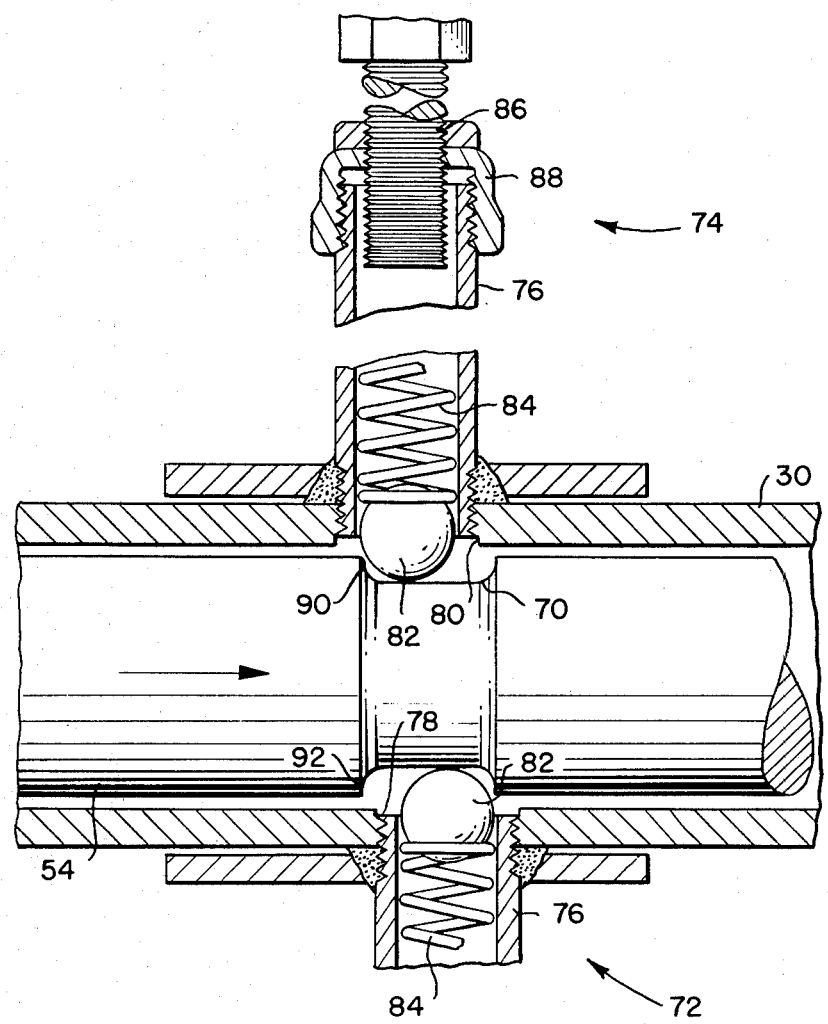
FIG. 3 is a sectional view of the stage adjustment assembly for the windmill blade stalling and speed control device of FIG. 2.

From a consideration of FIGS. 2 and 3, it will become readily apparent how the detent mechanisms 72 and 74 cooperate with the slot 70 in the shaft 54 to form a stage adjustment assembly which operates as a vernier for the bias spring 60. It will be noted in FIG. 3 that the detent mechanisms 72 and 74 are relatively displaced along the longitudinal axis of the stub shaft 54 and that the detent 70 is of appreciable width in the longitudinal direction of the stub shaft. This provides a two stage adjustment mechanism wherein, as the stub shaft 54 moves in the direction of the arrow in FIG. 3, the ball 82 of the detent mechanism 74 is the first to snap into the detent 70. As the shaft continues to move in the direction of the arrow, the ball of the detent mechanism 72 will also snap into the detent 70, but the ball of the detent mechanism 74 will now engage a shoulder 90 on the detent to arrest further longitudinal movement of the shaft 54 in the direction of the arrow. This arresting action aids the bias spring 60 in preventing further movement of the shaft 54, and thus the power position attained by the blades 26 at the time the detent shoulder 90 is engaged by the ball of the detent mechanism 74 will be maintained. This power position is maintained until wind velocity increases to a sufficient extent to overcome the combined biasing force of the biasing spring 60 and the detent spring 84 in the detent mechanism 74 to cause the ball 82 to snap over the shoulder 90. At this point, the shaft 54 will continue to move in the direction of the arrow in FIG. 3 against the bias of the spring 60 until the ball of the detent mechanism 72 engages against a shoulder 92. Now, further movement of the shaft 54 is again arrested until wind velocity increases to a degree sufficient to overcome the bias of the spring 60 and the detent spring 84 of the detent mechanism 72, and thus permit the ball 82 to snap over the shoulder 92. When this occurs, the shaft 54 will be permitted to continue to move against the bias of the spring 60 until full feathering of the blades 26 occurs.

The detent mechanisms 72 and 74 operate effectively to alter the bias curve of the spring 60 in such a manner that rapid and temporary changes in wind velocity will not function to drive the blades 26 away from a power position and into a feathered stall condition where such condition is not justified by a sustained wind velocity. It is important that the biasing spring 60 be adjustable so that the wind velocity at which the stage adjustment mechanism of FIG. 3 comes into operation may be controlled. This is accomplished by increasing or decreasing the compression of the spring 60 by means of the screw adjustment mechanism 62 bearing upon the button 66. Obviously, if the spring bias of the spring 60 is decreased, the ball 82 of the detent mechanism 74 will engage the shoulder 90 at a lower velocity than would be the case if the bias of the spring 60 is greater. Thus, the spring 60 determines the wind velocity at which the stage adjustment mechanism begins operation.

The range of velocities within which the individual detent mechanisms 72 and 74 will prevent further movement of the stub shaft 54 is determined by the adjustment of the bias springs 84. This range may be changed by means of the screw adjustment mechanism 86 which is operative to adjust the bias of the detent spring.

Other aspects, objects and advantages of this invention can be obtained from a study of the drawings, the disclosure and the appended claims.

I claim:

1. In combination with a windmill hub which is rotatable about an axis of rotation and supports the blades of a windmill, said hub including a casing, blade support means mounted upon the casing to receive and support a shaft for at least one windmill blade for rotational movement relative to said support means to alter the pitch of the windmill blade associated therewith, a windmill blade stalling and speed control device comprising pitch biasing means mounted upon said casing to oppose centrifugal force induced relative movement in at least one direction between said shaft and blade support means, said pitch biasing means including shaft movement responsive means which moves in response to centrifugal force induced relative movement between said shaft and blade support means, said shaft movement responsive means including a stub shaft movable longitudinally away from said hub against said pitch biasing means as the centrifugal force increases, and stage adjustment means mounted upon said casing for aiding said biasing means and increasing the opposition to said relative movement between said shaft and blade support means when said windmill hub and the blades supported thereby reach an entry speed of rotation within at least one of a plurality of sequential predetermined rotational speed ranges and to automatically cease to aid said opposition when the speed of rotation of said windmill hub and the blades supported thereby exceeds the last of the sequential predetermined rotational speed ranges, said stage adjustment means including at least one detent formed in the surface of said stub shaft intermediate its ends and biased bearing means mounted on said casing for engaging said detent when said stub shaft moves longitudinally to bring said detent into alignment with said bearing means, said bearing means including at least first and second detent assemblies spaced longitudinally along said stub shaft, each said detent assembly including a bearing member for engaging said detent, detent biasing means for biasing said bearing member toward said stub shaft and adjustment means for adjusting the bias of said detent biasing means, whereby said longitudinally spaced bearing members sequentially engage said detent as said stub shaft moves longitudinally to provide at least two separate impediments to longitudinal movement of said stub shaft and, thereby, to increase opposition to relative movement between said shaft and blade support means.

2. The combination of claim 1, wherein said pitch biasing means includes variable adjustment means operative to adjust the entry speeds of rotation for said plurality of predetermined speed ranges.

3. The combination of claim 1, wherein said pitch biasing means includes variable adjustment means operative to adjust the entry speeds of rotation for said plurality of predetermined speed ranges, said stage adjustment means operating to prevent said relative movement between said shaft and blade support means when said windmill hub and the blades supported thereby are rotating at a speed within one of said predetermined speed ranges.

4. The combination of claim 1, wherein said pitch biasing means includes a biasing spring extending between said casing and said stub shaft to oppose longitudinal movement of said stub shaft in one direction.

5. The combination of claim 4, wherein said pitch biasing means includes variable adjustment means mounted in said casing to adjust the spring bias of said biasing spring.

6. The combination of claim 5, wherein said shaft movement responsive means includes lever means mounted upon said blade shaft for movement therewith, and a bearing plate mounted on one end of said stub shaft, said lever means operating to move said bearing plate in response to movement of said blade shaft.

* * * * *